Dec. 15, 1959   W. A. PAPWORTH   2,917,088
MANUALLY PORTABLE POWER DRIVEN CUTTING TOOL WITH OVAL STROKE
Filed Dec. 4, 1956   2 Sheets-Sheet 2
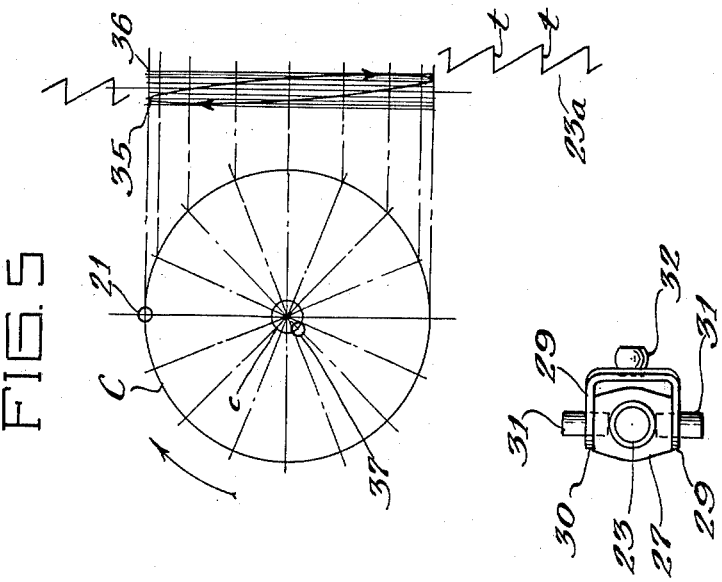
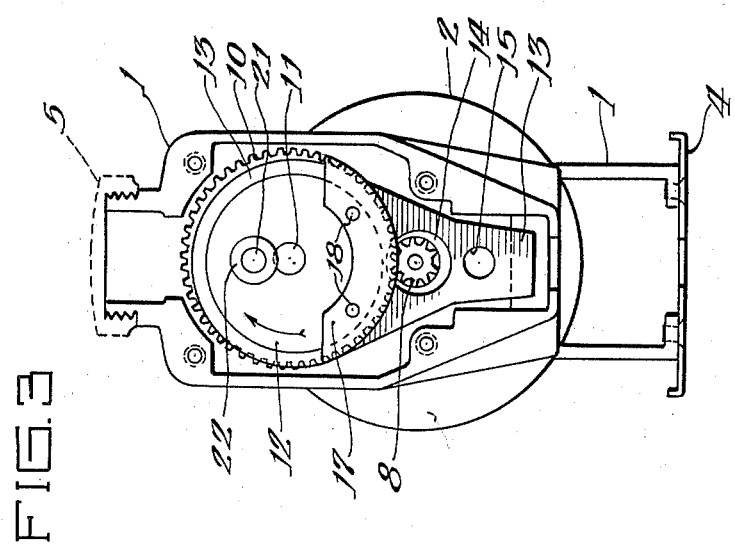
INVENTOR.
Walter A. Papworth
BY
Schroeder, Hofgren,
Brady & Wegner
Attorneys United States Patent Office 2,917,088
Patented Dec. 15, 1959

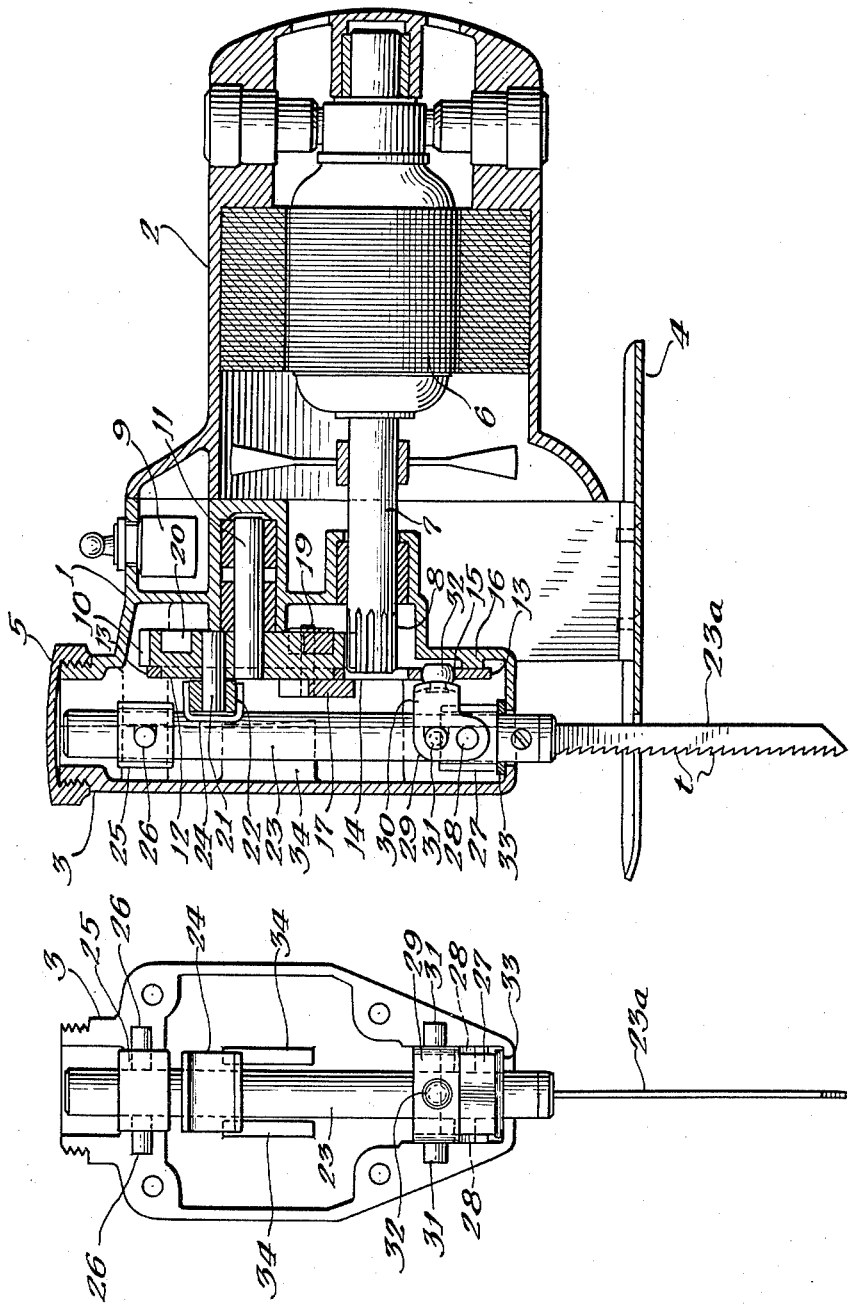

2,917,088
MANUALLY PORTABLE POWER DRIVEN CUTTING TOOL WITH OVAL STROKE

Walter A. Papworth, Syracuse, N.Y.

Application December 4, 1956, Serial No. 626,198

5 Claims. (143—68)

This invention relates to power driven reciprocable cutting tools, and more specifically it relates to bayonet saws in which the cutting tool is retracted from the work face during its return stroke, and in which the cutting tool is unattached at its protruding end.

The principal object of the invention is to provide such a tool in which the tool plunger is supported for reciprocation in two widely spaced apart bearings, and in which the bearing which is closer to the cutting tool receives and imparts forward and backward movement to the tool plunger and cutting tool, while the bearing which is more remote from the cutting tool acts as a fulcrum.

A further object is to provide such a tool with an arrangement of basic parts resembling that of a conventional electric drill.

A further object is to provide such a tool wherein a substantially vertical cutting tool is caused to slash forward obliquely into the work during nearly all of its cutting stroke and is retracted near the end of the cutting stroke.

A further object is to release the sawdust from between the teeth of the cutting tool near the end of the cutting stroke and cause it to flow out of the top of the work.

A further object is to provide such a tool which is simple, sturdy, and cheap.

In the attached drawings,

Fig. 1 is a vertical cross section of a machine embodying this invention, showing the working parts inside.

Fig. 2 is an inside view of the front cap removed from the machine, showing the working parts which are mounted in it.

Fig. 3 is a front end view of the machine with the front cap removed.

Fig. 4 is a plan view of the lower bearing assembly.

Fig. 5 is a motion diagram, the scale of which is 4 to 1 as compared to Figs. 1 to 4, showing enlarged the path generated by each individual tooth of a substantially vertical saw blade, and sections of saw teeth at their most advanced and most retracted positions.

Referring to the drawings in greater detail, the frame of the tool is composed of a gear case 1, a motor case 2, a front closure 3, and a foot plate 4, suitably connected by screws. A cap 5 at the top provides access for lubrication and finish.

A motor 6 has a shaft 7 journalled in the frame, and the shaft has a pinion 8 on it. A switch 9 controls current supply to the motor.

A gear 10 has a shaft which is journalled in the frame so that the gear meshes with the aforesaid pinion. The gear has an eccentric 12, and upon this is journalled an eccentric strap 13 having a downward extending tail, in which is a clearance hole 14 for the end of the motor pinion, and a journal hole 15. The eccentric strap is supported for sliding movement on a ledge 16 in the frame. A counterbalance member 17 is attached to the eccentric by rivets 18, and serves to hold the eccentric strap in place on the eccentric. Another counterbalance member 19 is mounted in an annular recess 20 turned in the rear side of the gear, and the rivets pass through and hold both counterbalances. The gear also has a crank pin 21, upon which is journalled a roller 22.

A tool plunger 23 is supported for sliding movement in an upper bearing 25 and a lower bearing 27 which are spaced apart as widely as the proportions of the frame permit, and is provided with a cross-head or Scotch yoke member 24 which is adapted to engage the roller 22.

The upper bearing 25 is journalled in the frame on trunnions 26 to allow the tool plunger a slight rocking as well as longitudinal movement.

The lower bearing 27 has lateral trunnion pins 28 engaging the side portions 29 of a bifurcated arm of a bell crank 30 which is supported on pins 31 positioned above the trunnions 28, so that rocking of the bell crank on its pins may move the bearing back and forth; and the bell crank has a rear arm provided with a spherical stud 32 engaged in the journal hole 15 of the eccentric strap 13, so that movement of the strap acts through the bell crank to move the bearing. Obviously the lower bearing could be mounted to slide in the frame, and could be actuated by other means such as an inclined cam on the eccentric strap. A felt washer 33 is provided to retain lubricant.

Ribs 34 in front closure 3 provide guides for the cross head 24 during the cutting portion of the stroke and are shaped on their guiding surfaces to conform to the movement of the cross head. A saw blade 23a having teeth "t," or other cutting tool, is affixed to the lower end of the tool plunger and protrudes below the base 4.

In Fig. 5, which is scaled at 4 to 1 as against Figs. 1 to 4, the larger circle "c" represents the path of the crank pin 21, and is spaced off into equal angular divisions which are projected to the right and connected by diameters. The points 35 and 36 are spaced off on the upper projection line by the distance which the cutting tool moves horizontally at the level of the base plate 4. An inner circle "c" whose diameter is the distance 35—36 is inscribed concentrically within the crank pin circle; and the small circuit 37 on the inner circle "c" designates the angular position of the center of the eccentric 12 with reference to that of the crank pin 21. The vertical heights of the intersections of the circle "c" with the diameters are plotted off on the line 35—36, horizontally by reason of the change of vertical to horizontal movement by the bell crank. Lines are drawn through the points 35, 36, and the intervening points which were plotted in, and these lines converge to a point representing to scale the distance from the foot plate 4 to the trunnion pin 26 of the upper bearing. On the coordinate chart thus produced the path of a single tooth "t" of the cutting tool is plotted, from the level of the foot plate 4, down the length of the stroke, and back up to the foot plate. The other teeth follow similar paths, but vary minutely in horizontal movement because of their varying distances from the pivot 26.

As will be seen from the resultant diagram, the form of the stroke is such that the cutting tool is forced forward into the work during nearly all of its cutting stroke in a somewhat oblique path, and is retracted near the end of the cutting stroke so that the chips are thrown out before the cutting tool begins its return stroke.

The foregoing detailed description is given for clearness of understanding only and no unnecessary limitations are to be understood therefrom, as some modifications will be obvious to those skilled in the art.

I claim:

1. A power driven reciprocable cutting tool comprising: a frame having a foot plate adapted to normally support the tool against the work; a motor in the frame, said motor having a shaft provided with a pinion; a gear journalled in the frame and meshing with said pinion; first guide means pivotally mounted in the upper part of the frame; a tool plunger the upper portion of which engages said first guide means so that the tool plunger is guided for endwise and arcuate movement; a cutting tool secured to said tool plunger; a crank pin on the gear; means operatively driven by the crank pin for driving the tool plunger endwise; a bell crank pivotally mounted in the frame; sleeve guide means pivotally mounted in the bell crank on an axis perpendicular to the bore of the sleeve and embracing the lower portion of the tool plunger; an eccentric on the gear; and an eccentric strap journalled on the eccentric and having operative engagement with the bell crank, the whole being so proportioned and coordinated that the sleeve guide means forces the tool plunger and cutting tool forward into the work in an oval path during the cutting stroke and retracts the tool from the work during the return stroke.

2. A power driven reciprocable cutting tool comprising: a frame; a motor in the frame, said motor having a shaft provided with a pinion; a gear journalled in the frame meshing with said pinion and having its axis parallel with said motor shaft, said gear being provided with a crank pin and an eccentric; a tool plunger in a plane passing through the axes of the gear and motor shaft; a cutting tool secured to the tool plunger; a first guide member engaging the upper portion of the tool plunger and rockably mounted in the frame on an axis perpendicular to said plane; a member journalled on the crank pin and operatively engaging the tool plunger for endwise actuation thereof; an eccentric strap journalled on the eccentric; a sleeve guide member embracing the lower portion of the tool plunger; and means actuated by the eccentric strap and actuating the second guide member to oscillate the tool plunger positively in said plane in timed relationship with its endwise actuation.

3. A power driven reciprocable cutting tool comprising: a frame; a motor in the frame, said motor having a shaft provided with a pinion; a gear journalled in the frame meshing with said pinion and having its axis parallel with said motor shaft, said gear being provided with a crank pin and an eccentric; a tool plunger in a plane passing through the axes of the gear and motor shaft; a cutting tool secured to the tool plunger; a first guide member engaging the upper portion of the tool plunger and rockably mounted in the frame; a member journalled on the crank pin and operatively engaging the tool plunger for endwise actuation thereof; an eccentric strap journalled on the eccentric; a sleeve guide member pivoted on an axis perpendicular to its bore and embracing the lower portion of the tool plunger; and a bell crank pivoted in the frame and having operative engagement with the eccentric strap and with the sleeve guide member whereby the sleeve guide member is actuated in a direction substantially parallel with the axis of the gear.

4. A power driven reciprocable manually portable cutting tool comprising: a frame having a foot plate adapted to normally support the tool against the work; a motor in the frame, said motor having a shaft provided with a pinion; a gear journalled in the frame meshing with said pinion with its axis parallel with the motor shaft, said gear being provided with an eccentric and a crank pin; a tool plunger in a plane passing through the axes of the gear and motor shaft; a first guide member engaging the upper portion of the tool plunger and rockably mounted in the frame; a second guide member engaging the lower portion of the tool plunger; a bell crank having downwardly extending arms embracing the sides of the second guide member and pivotally connected therewith, said bell crank having outwardly extending trunnions journalled in the frame above said pivotal connections, the bell crank having a rearwardly extending portion terminating in a spherical stud; an eccentric strap journalled on the eccentric and operatively engaging said stud; a Scotch yoke member on the tool plunger; and a roller on the crank pin operatively engaging the Scotch yoke member.

5. A power driven, reciprocable cutting tool comprising: a frame; a motor in the frame, said motor having a motor shaft; a tool plunger mounted in the frame for endwise movement; a cutting tool secured to the tool plunger; first and second eccentric means in the frame operatively connected with the motor shaft; a first operative connection from said first eccentric means to the tool plunger to reciprocate the tool plunger endwise; guide means guiding the tool plunger in the frame, said guide means including a lower guide sleeve rockably supported in the frame on an axis perpendicular to its bore and slidably embracing the lower portion of said plunger; a lever member pivotally mounted in the lower portion of the frame with an end portion operatively engaging said lower guide sleeve; and a second operative connection from said second eccentric means to the lever to rock the lever on its pivot and thereby rock said lower guide sleeve, the relationship between said first and second eccentric means, said first and second drive means, and said lever and lower guide sleeve being such that the rocking of the lever moves the cutting tool edgewise into the work in an oval path during the cutting stroke.

References Cited in the file of this patent
UNITED STATES PATENTS

| | | |
|---|---|---|
| 114,833 | Lewis | May 16, 1871 |
| 2,432,562 | Dill | Dec. 16, 1947 |
| 2,501,631 | Oschwald | Mar. 21, 1950 |
| 2,704,941 | Holford | Mar. 29, 1955 |
| 2,775,272 | Papworth | Dec. 25, 1956 |
| 2,781,800 | Papworth | Feb. 19, 1957 |